United States Patent [19]

Wesley

[11] Patent Number: 5,529,526
[45] Date of Patent: Jun. 25, 1996

[54] TURKEY CALLER

[76] Inventor: Ben G. Wesley, Rte. 2 Box 190-A, Banks, Ala. 36005

[21] Appl. No.: 505,393

[22] Filed: Jul. 21, 1995

[51] Int. Cl.⁶ ........................................... A63H 5/00
[52] U.S. Cl. .................. 446/397; 446/418; 84/410; 84/404
[58] Field of Search .................... 446/397, 402, 446/404, 408, 418, 414, 489; 43/2; 84/411 P, 410, 404, 402, DIG. 12

[56] References Cited

U.S. PATENT DOCUMENTS

| | | | |
|---|---|---|---|
| 471,046 | 3/1892 | Wilskey | 84/402 |
| 1,418,401 | 6/1922 | Schmidt . | |
| 2,025,181 | 12/1935 | Simon | 446/397 |
| 2,515,023 | 7/1950 | Thompson et al. | 446/397 |
| 4,003,159 | 1/1977 | Piper | 446/397 |
| 4,310,986 | 1/1982 | Jacobs . | |
| 4,662,858 | 5/1987 | Hall | 446/397 |
| 4,787,876 | 11/1988 | Nguyen et al. | 446/408 |
| 4,854,914 | 8/1989 | White, Jr. . | |
| 4,904,221 | 2/1990 | Taylor | 446/397 |
| 5,066,260 | 11/1991 | Lindler . | |
| 5,234,368 | 8/1993 | Carraway . | |

*Primary Examiner*—Robert A. Hafer
*Assistant Examiner*—D. Neal Muir
*Attorney, Agent, or Firm*—Jacobson, Price, Holman & Stern

[57] ABSTRACT

A turkey caller for producing sounds for enticing wild turkey gobblers by producing life-like turkey hen yelps, clucks and purrs. The turkey caller is of durable construction and functions properly in various climatic conditions and even if the sound producing metallic components become rusted. The turkey caller combines a metallic striker plate or sound board having a roughened upwardly facing surface formed by sanding the surface and a striker in the form of a rod-like structure having a handle at one end which includes a sound chamber. The sound board and striker produce sounds closely simulating sounds produced by live turkey hens when the other end of the rod is moved against the roughened surface of the sound board.

9 Claims, 1 Drawing Sheet

U.S. Patent     Jun. 25, 1996     5,529,526
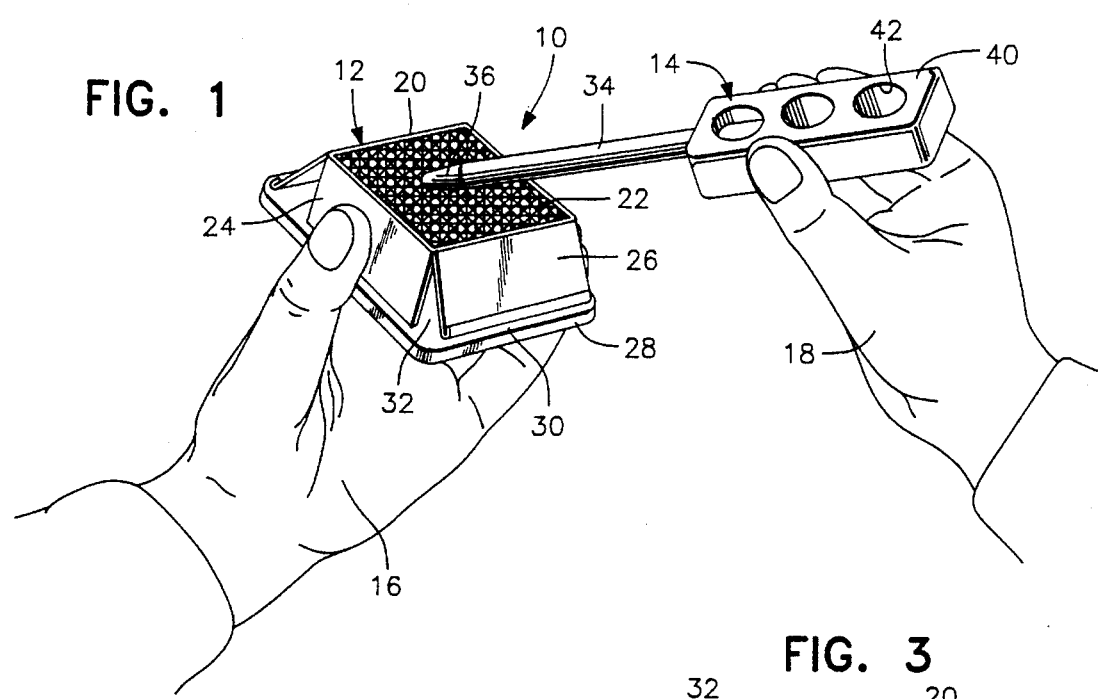
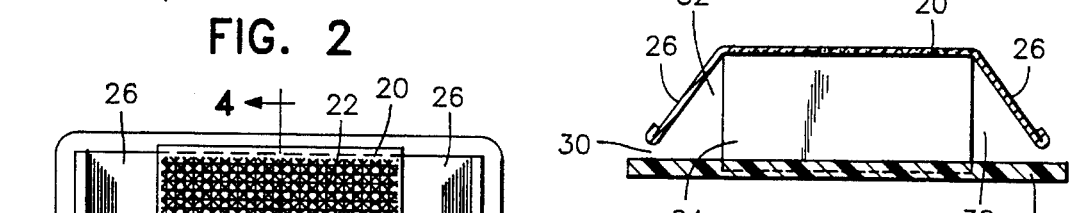
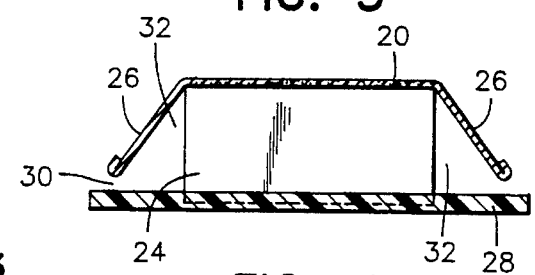
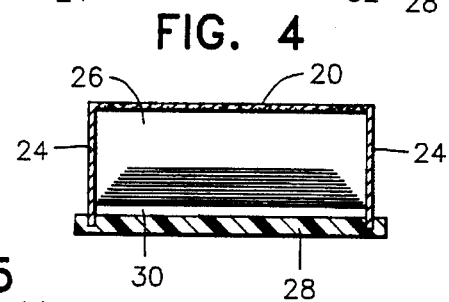
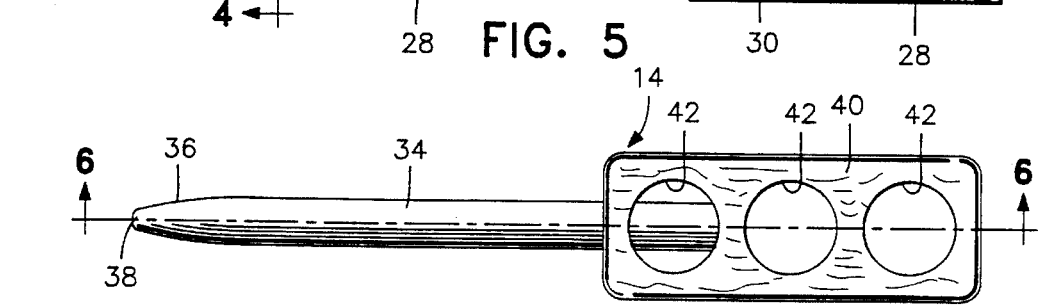
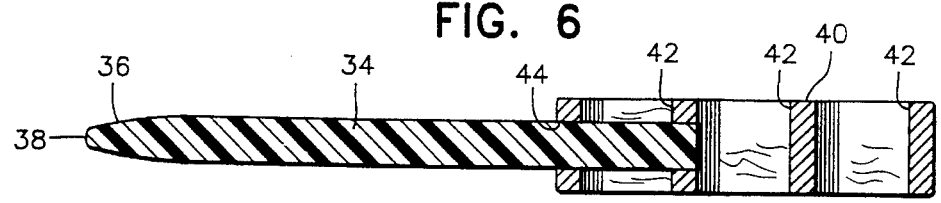

TURKEY CALLER

BACKGROUND OF THE INVENTION

1. Field of the Invention

The present invention generally relates to a turkey caller by which a hunter can produce sounds having characteristics quite similar to sounds produced by live turkeys to entice turkeys to approach the hunter in view of the natural instinct of turkeys to gather into a flock thereby enabling a hunter to have a better chance of getting a good shot at a wild turkey. The turkey caller of this invention is uniquely constructed to produce life-like turkey hen yelps, clucks and purrs for enticing wild turkey gobblers toward the hunter using the turkey caller. The turkey caller is of durable construction and functions properly in various climatic conditions and even if the sound producing metallic components become rusted.

2. Description of the Prior Art

Callers for various wild game are well known and some are commercially available which enable a hunter or other person to produce sounds which are simulative of natural sounds produced by the targeted wild game in order to entice wild game into the vicinity of the person using the caller. Turkey callers are available and utilize basically the same components including a striker plate or sound board and a striker that engages the striker plate or sound board to produce sound vibrations to imitate the sound of a turkey. While such devices perform to some degree of satisfaction, there continues to be a need for an effective turkey caller that produces life-like sounds but also functions properly regardless of weather conditions and even if the striker plate or sound board becomes rusted. The following U.S. patents relate to this field of endeavor.

U.S. Pat. No. 1,418,401
U.S. Pat. No. 4,310,986
U.S. Pat. No. 4,854,914
U.S. Pat. No. 5,066,260
U.S. Pat. No. 5,234,368

While the above patents disclose the previously discussed basic structural components, the prior art does not disclose the specific structure of the turkey caller of this invention and the prior art does not disclose the manner in which the components of the turkey caller of this invention are formed and assembled.

SUMMARY OF THE INVENTION

An object of the invention is to provide a turkey caller combining a metallic striker plate or sound board having a roughened upwardly facing surface formed by sanding the surface together with a striker in the form of a rod-like structure having a handle at one end which includes a sound chamber for producing sounds closely simulating sounds produced by live turkeys.

Another object of the invention is to provide a turkey caller in accordance with the preceding object in which the caller is effective in producing sounds closely simulating the sounds produced by live turkey hens for enticing turkey gobblers.

A further object of the invention is to provide a turkey caller in which the striker plate or sound board is generally square or rectangular with downwardly extending side flanges with two of the side flanges extending downwardly at 90° and being connected to a base plate and the other two opposite side flanges extending downwardly at a lesser angle with the bottom edges being spaced above the upper surface of the base plate.

Still another object of the invention is to provide a turkey caller in accordance with the preceding objects in which the upper surface of the striker plate or sound board is roughened by sanding the surface and the striker is a rod constructed of plastic material having a generally tapering end terminating in a flat tip with the handle being of wood material and the sound chamber or chambers being in the form of openings through the handle.

A still further object of the invention is to provide a turkey caller in accordance with the preceding objects in which the base plate is a generally flat panel of plastic material with the lower edges of the 90° flanges being embedded in the plastic material inwardly of the side edges of the base plate to facilitate grasping of the base plate and 90° flanges to support the striker plate or sound board in position for engagement by the hand held striker.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the turkey caller of the present invention illustrating the manner in which the components of the caller are used to produce sounds which closely simulate the sounds produced by live turkey hens.

FIG. 2 is a top plan view of the striker plate or sound board component of the turkey caller.

FIG. 3 is a longitudinal, sectional view taken along section line 3—3 on FIG. 2 illustrating the relationship between the downwardly angled side flanges and the base plate.

FIG. 4 is a transverse, sectional view taken along section line 4—4 on FIG. 2 illustrating the association of the 90° side flanges and the base plate.

FIG. 5 is a plan view of the striker.

FIG. 6 is a longitudinal, sectional view of the striker taken substantially along a plane passing along line 6—6 on FIG. 5 illustrating the association of the striker rod, the striker handle and the sound chambers in the handle.

DESCRIPTION OF THE PREFERRED EMBODIMENT

FIG. 1 illustrates the turkey caller of the present invention which is generally designated by reference numeral 10 and includes a striker plate or sound board 12 and a striker 14 which are held in the hands 16 and 18 of a hunter or other person to produce sounds quite similar to the sounds produced by live turkeys, especially turkey hens.

FIGS. 2–4 illustrate the specific structural details of the striker plate or sound board 12 which includes a metallic plate 20 of square configuration having a substantially planar upper surface that has been roughened by sanding as indicated by reference numeral 22. Two opposed side edges of the plate 20 include depending flanges 24 which are oriented in substantially 90° relation or perpendicular relation to the horizontally disposed plate 20. The other two opposed side edges of the plate include downwardly and outwardly inclined side flanges 26 oriented at an angle less than 90° and preferably at an angle of approximately 55° in relation to the plate 20. The side flanges 24 are generally parallel to each other as illustrated in FIG. 3 and are engaged in and supported by a base plate 28 of plastic material such as "PLEXIGLAS". The bottom edges of the flanges 24 are embedded in the top surface of the base plate 28 as illustrated in FIG. 4 and the bottom edges of the flanges 24 are spaced inwardly from the side edges of the base plate 28. The base plate 28 is generally rectangular in configuration and the end edges thereof extend beyond the bottom edges of the flanges 26 as illustrated in FIG. 3. Also, as illustrated in FIG. 3, the bottom edge of each of the flanges 26 is spaced above and free of the top surface of the base plate 28 with an airgap 30 formed between the bottom edge of the flanges 26 and the top surface of the base plate 28.

In constructing the striker plate or sound board Component 12 of the turkey caller, a 4 inch square sheet metal member of 14 gauge or 3/64 inch in thickness is utilized with a 1 inch square corner segment of the plate being removed from each corner. Two opposite side flanges are then folded to perpendicular or 90° relation to the central square portion of the sheet metal plate and the two opposite side flanges are bent or folded to a lesser angle, preferably about 55°. This forms the square plate 20, the perpendicular flanges 24 and the inclined flanges 26. The plastic base plate 28 is preferably rectangular and is 3 1/2 inches long, 2 1/2 inches wide and 1/8 inch thick and provided with rounded corners as illustrated in FIG. 2. In assembling the formed metal plate with the plastic base plate, the perpendicular side flanges 24 are heated to a temperature above the melting point of the plastic base plate and the bottom edges of the flanges 24 are pressed down into the plastic while at a temperature above the melting point of the plastic with the bottom edges of the flanges 24 penetrating to a depth of approximately one half of the thickness of the plastic base plate 28 with subsequent cooling of the flanges 24 securely attaching the flanges 24 to the base plate 28.

With this construction, sound produced by the sound board or plate 20 when engaged by the striker 14 can exit through the airgaps between the lower edges of the flanges 26 and the upper surface of the base plate 28 and also through the open corner areas 32 formed when the flanges 26 are bent or folded at an angle of approximately 55° as illustrated in FIGS. 1 and 3. The upper surface of the sound board or plate 20 is sanded to provide the roughened surface 22 to obtain the desired sound characteristics produced when the striker 14 is engaged with the friction surface 22. Also, it is preferable to paint the surfaces of the flanges and the base plate a color that reduces the possibility of a turkey observing the turkey caller since concealment of the turkey caller from the turkey is essential. The upper surface of the sound board or plate 20 also is provided with a nonreflective surface produced by sanding or it may also be provided with color characteristics that prevents light reflection that might be observed by live turkeys.

The striker 14 includes an elongated rod 34 of cylindrical cross-sectional configuration having a slightly tapered tip end 36 terminating in a blunt tip 38. The rod 34 is supported in a handle 40 in the form of a sound block constructed from walnut wood that is provided with a plurality of circular sound chambers 42 in the form of large apertures extending through the sound block. The end of the rod 34 opposite from the tapered end 36 is inserted into and secured in an aperture 44 that intersects with and is perpendicular to the sound chamber 42 at one end of the sound block 40. The handle or sound block 40 is formed from walnut wood 3 inches long, 1 1/8 inch wide and 3/4 inch thick with the sound chambers 42 being 3/4 inch in diameter and equally spaced along the longitudinal center line of the block 40. The rod 34 is a 3/8 inch rod of "PLEXIGLAS" tapering to a 1/4 inch diameter tip 38. The aperture 44 is drilled along the longitudinal center line of the block 40 equally spaced from the top and bottom surfaces thereof and diametrically of the sound chamber 42 and to the periphery of the middle sound chamber as illustrated in FIG. 6 with the rod 34 being glued in place with approximately 3 3/4 inch of the rod 34 extending outwardly from the end of the sound block or handle 40. The block 40 being constructed of walnut will not be easily observed and the rod may be provided with a nonreflective surface to maintain concealment of the turkey caller.

The turkey caller is used generally as illustrated in FIG. 1 by grasping the two components in the hands 16 and 18 of a user with the striker 14 moved in a striking motion with the tip 38 engaging the sanded roughened surface 22 of the sound board or striker plate 20. By manipulating the striker 14 in different associational relationships with the surface 22 of the sound board 20, sounds can be produced which are quite similar to turkey hen yelps, clucks and purrs to effectively attract live turkey gobblers toward the area from which the sounds emanate. By varying the associational relationship of the components and moving the striker in different patterns, a hunter or other person can produce lifelike turkey hen sounds. The construction of the turkey caller is such that it will perform effectively in various weather conditions such as rainy conditions, dry conditions, hot conditions, cold conditions and will also effectively produce life-like sounds even if the roughened surface 22 becomes rusted thus providing a turkey caller that is durable, long lasting, uniquely constructed, simple to operate and effective for producing life-like sounds simulative of live turkey hen sounds. The disclosure relates specifically to calling turkey gobblers.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A turkey caller for producing sounds which closely simulate live turkey hen sounds, said turkey caller comprising a striker plate and striker for engaging the striker plate to produce sounds similar to live turkey hen sounds, each of said striker plate and striker being hand held to enable movement of the striker in relation to the striker plate, said striker plate including a generally square metal plate forming a sound board, said sound board including a generally planar metal surface, said planar surface being roughened, said metal plate having depending flanges on each edge, a base plate generally parallel to said metal plate, the depending flanges on one set of opposite edges of the metal plate being secured to said base plate to support the metal plate in spaced relation to the base plate, the depending flanges on the other set of opposite edges of the metal plate having lower edges spaced from the base plate to provide airgaps for passage of sound emanating from the sound board, said striker including an elongated rigid plastic rod having a wood sound block on one end forming a handle for the rod, said rod including a free end remote from the handle for engagement with the roughened surface of the sound board for producing sounds similar to sounds produced by wild turkey hens for enticing wild turkey gobblers toward the sounds produced by the caller.

2. A turkey caller for producing sounds which closely simulate live turkey hen sounds, said turkey caller comprising a striker plate and striker for engaging the striker plate to produce sounds similar to live turkey hen sounds, each of said striker plate and striker being hand held to enable movement of the striker in relation to the striker plate, said striker plate including a generally square metal plate forming a sound board, said sound board including a generally planar metal surface, said planar surface being roughened, said striker including an elongated rigid rod having a sound block on one end forming a handle for the rod, said rod including a free end remote from the handle for engagement with the roughened surface of the sound board for producing sounds similar to sounds produced by wild turkey hens for enticing wild turkey gobblers toward the sounds produced by the caller, said sound board including depending flanges at opposite sides thereof oriented in generally perpendicular relation to the sound board, said sound board also including depending flanges at other opposite sides thereof at an angle less than 90°, the side flanges perpendicular to the sound board having lower edges connected to a base plate, the side flanges at less than 90° having lower edges terminating in spaced relation to the base plate to provide airgaps for passage of sound emanating from the sound board.

3. The turkey caller as defined in claim 2 wherein said base plate is of plastic material, said lower edges of said perpendicular flanges being embedded in said plastic base plate for mounting the sound board on the base plate.

4. The turkey caller as defined in claim 2 wherein said sound block is wood, said rod extending from one end of the wood block, said wood block including transverse open ended sound chambers therein for producing sounds resulting from the rod moving in relation to and in engagement with the roughened surface on the sound board.

5. The structure as defined in claim 3 wherein said sound block is wood, said rod extending from one end of the wood block, said wood block including transverse open ended sound chambers therein for producing sounds resulting from the rod moving in relation to and in engagement with the roughened surface on the sound board.

6. A caller for animals by producing sounds which closely simulate live animal sounds, said caller comprising a striker plate and striker for engaging the striker plate to produce sounds similar to live animal sounds, each of said striker plate and striker being hand held to enable movement of the striker in relation to the striker plate, said striker plate including a generally flat plate forming a sound board, said sound board including a generally planar surface, said planar surface being roughened, said striker including an elongated rigid rod having a sound block on one end forming a handle for the rod, said rod including a free end remote from the handle for engagement with the roughened surface of the sound board for producing sounds similar to sounds produced by live animals to entice other live animals toward the caller, said sound board being polygonal and including depending flanges at opposite sides thereof oriented in generally perpendicular relation to the sound board, said sound board also including depending flanges at other opposite sides thereof at an angle less than 90°, the side flanges perpendicular to the sound board having lower edges connected to a base plate, the side flanges at less than 90° having lower edges terminating in spaced relation to the base plate to provide airgaps for passage of sound emanating from the sound board.

7. The caller as defined in claim 6 wherein said base plate is of plastic material, the lower edges of said perpendicular flanges being embedded in said plastic base plate for mounting the sound board on the base plate.

8. The caller as defined in claim 7 wherein said sound block is wood and forms a handle, said rod extending from one end of the wood block, said wood block including transverse open ended sound chambers therein for producing sounds resulting from the rod moving in relation to and in engagement with the roughened surface on the sound board.

9. The structure as defined in claim 8 wherein said sound board and flanges are metal and said base plate is plastic, said elongated rod being plastic with said free end tapering to a blunt end, said rod extending longitudinally into said sound block and transversely across at least one sound chamber.

* * * * *